United States Patent Office 3,098,045
Patented July 16, 1963

3,098,045
SUGAR REFINING ADSORBENT
Aldo P. Allegrini, Westfield, and Tom A. Cecil, Highland Park, N.J., assignors to Minerals & Chemicals Philipp Corporation, a corporation of Maryland
No Drawing. Filed Mar. 1, 1960, Ser. No. 11,975
4 Claims. (Cl. 252—455)

The present invention has to do with the refining of impure sugar solutions to decolorize and reduce the ash content of the same. The invention relates especially to a novel bauxite-containing adsorbent and the preparation thereof.

The principal requirements of an effective adsorbent for the purification of sugar solutions are the ability to remove color bodies in the solution and the ability to remove mineral matter, the so-called "ash." An adsorbent must also be capable of being maintained in contact with the sugar liquid without reducing the pH of the liquid below that value at which appreciable inversion of the sugar will take place. On the other hand, the adsorbent must not appreciably increase the pH of the sugar solution since this favors the development of new color bodies in the solution. Normally the pH of the adsorbent treated sugar solution should be neutral or within the range of 7.0 to 8.0.

In addition to satisfying the above-mentioned requirements, it is essential that the adsorbent be hard in the sense that it is resistant to crushing and abrasion. The adsorbent is subjected in handling, in the sugar filtration operation as well as during revivification, to forces which tend to break the adsorbent granules unless they possess sufficient mechanical strength. Disintegration of the adsorbent granules into useless fines represents an economic loss.

One of the materials that has been suggested for use as a sugar decolorizing agent is bauxite, an ore consisting principally of a hydrated alumina. Bauxite is an excellent decolorizing agent for sugar solutions and also possesses outstanding ash removal properties, especially when the ore is granulated and activated. Bauxite is activated by calcining the ore at 600° F. to 900° F. to a volatile matter content of the order of about 2 to 6 percent. The term "volatile matter" (or V.M.) as used herein refers to the weight percentage of a material eliminated by heating it to constant weight at 1800° F. In the case of bauxite, volatile matter is chiefly water. Although the activated bauxite ore is an excellent ash removal and decolorizing agent in the filtration of sugar solutions, it possesses some detrimental features. One is that the activated bauxite has a high heat of wetting. As a result of heat evolved when bauxite is wet with a sugar solution, caramelization of the sugar solution may take place, especially when large filter units are employed and the heat cannot be dissipated. Another deficiency of the activated bauxite is that it sometimes tends to lower the pH of sugar solutions, particularly when the bauxite has been subjected during production or revivification to temperatures of the order of 1000° F. to 1600° F.

In sugar decolorizing operations the sugar solution is percolated through a bed of granulated activated bauxite. The granules may be relatively coarse, such as particles of 10/30 mesh, or they may be somewhat finer, such as for example 20/60 mesh.

The nature of the bauxite ore is such that when it is crushed into granules of a size suitable for use as a percolation adsorbent, a considerable percentage of fines, that is, particles about 40 to 60 mesh of finer, are simultaneously produced. The bauxite fines are too small to be utilized in sugar filtration or other adsorption processes. No method has been found for binding these fines into granules of suitable particle size which maintain their hardness in the presence of aqueous liquids and which also possess acceptable decolorizing capacity for sugar solutions.

Accordingly, a principal object of the instant invention is the production from bauxite fines of a hard composite granular adsorbent which is particularly useful in the percolation filtration of sugar solutions to remove solubilized color bodies and ash therefrom.

Still another object of the invention is the production of a granular adsorbent from bauxite fines which is at least comparable in hardness and decolorizing efficiency in the filtration of sugar solutions with activated bauxite ore and which does not undesirably affect the hydrogen ion concentration of sugar solutions.

These and further objects and advantages are realized in accordance with the present invention which contemplates the production of a hard granular sugar decolorizing agent from bauxite fines.

Briefly stated, the novel adsorbent of the present invention is prepared by mixing uncalcined bauxite fines with water, an alkali metal hydroxide and colloidal attapulgite clay, and agglomerating the mixture. The agglomerates are then fired at very elevated temperature, in excess of 1600° F. and below the fusion point of the mixture, in order to set the binder and dehydrate substantially completely the agglomerates.

The adsorbent product of this invention is comparable in hardness to granular grades of bauxite produced by crushing and activating the naturally occurring ore and is at least as effective as the activated granular ore in decolorizing many types of sugar liquids. An important advantage of the composite granular bauxite product of the present invention is that it has a lower heat of wetting than the prior art activated bauxite ore. As a result of this, the possibility of caramelizing sugar solutions is minimized. Further, the adsorbent bauxite product of the invention does not lower the pH of sugar solutions to undesirable levels even though the adsorbent product during its production has been calcined at a temperature which normally would have an adverse effect on the alkaline buffering power of bauxite.

The mechanism by which the alkali and colloidal attapulgite clay bind the bauxite fines in accordance with the present invention is not fully understood. It is thought that small quantities of a zeolite are formed in situ when the aqueous mixture of bauxite fines, alkali and clay is fired and that the zeolite plays a part in bonding the bauxite fines.

The use of the combination of alkali and colloidal attapulgite clay as the binding agent for the bauxite fines is an essential feature of our invention. When the colloidal attapulgite clay is employed without alkali, the fired granules lack the desired hardness after they have come in contact with water, as during washing or during contact with sugar solutions. Although the alkali alone will bind the bauxite fines into granules which are satisfactory in hardness after being fired at about 1700° F., the resultant product is relatively ineffectual in decolorizing sugar solutions as compared with the prior art activated bauxite ore. The use of the attapulgite clay together with alkali results in the production from bauxite fines of granules which possess the requisite hardness and which also are very effective in decolorizing sugar solutions. This result is unexpected since attapulgite clay is normally not an effective decolorizing agent for sugar solutions and would be expected to contribute nothing to the decolorizing capacity of the bauxite.

As mentioned, another essential feature of the method of our invention is that calcination of an aqueous mixture of bauxite, colloidal clay and alkali is conducted at a temperature in excess of 1600° F. It is indeed surprising and unexpected that the resultant product is capable of decolorizing sugar solutions. In general, it may be said that the prior art teaches that bauxite intended for sugar decolorization should be calcined at a temperature which is preferably within the range of 600° F. to 900° F. and which should not exceed 1600° F. When bauxite is activated at a temperature within the range of 600° F. to 900° F., the surface area of the ore attains a maximum. When calcination is carried out at temperatures in excess of 900° F., the surface area decreases. The surface area of bauxite calcined at 1600° F. or higher is only a small percentage of the surface area of bauxite activated at 600° F. to 900° F., although the equivalent pore diameter of the product is larger. An article entitled "Some Physical Properties of Activated Bauxite," by Heinz Heinemann et al., appearing in Industrial Engineering Chemistry, 38 (8), 839 (1946), correlates the effect of calcination temperature with those physical characteristics which affect the adsorptive properties of bauxite ore. It is known that the surface area of attapulgite clay decreases substantially when it is calcined at temperatures higher than 1000° F. The prior art teaches that when attapulgite clay is employed to control the pH of sugar solutions it should not be calcined at a temperature above 1200° F.

More specifically, the bauxite fines we use as a starting material in producing the novel adsorbent is usually obtained as a by-product in the crushing and screening of whole ore to produce granular grades of bauxite. If desired, the entire ore may be intentionally crushed to the desired fine particle size. The fines we employ consist of particles substantially all of which are finer than about 35 mesh. The nature of the bauxite ore is such that usually the major weight proportion of the particles is finer than 60 mesh and coarser than 325 mesh. Normally the content of minus 325 mesh material will not exceed about 25 percent by weight of the bauxite fines. The fines consist of aggregated bauxite particles which are obviously more difficult to bind into hard granules than individual microscopic mineral crystals would be.

Typical screen analyses (Tyler sieve) of suitable bauxite fine starting materials are as follows:

| Mesh size | Sample 1, weight percent | Sample 2, weight percent |
|---|---|---|
| 0/35 | 0.2 | 0.2 |
| 35/48 | 0.5 | 26.1 |
| 48/60 | 4.3 | 29.0 |
| 60/80 | 15.0 | 20.7 |
| 80/100 | 12.6 | 4.9 |
| 100/150 | 23.0 | 5.4 |
| 150/200 | 27.8 | 4.6 |
| Through 200 | 16.6 | 9.1 |

The fines we use are uncalcined in the sense that they contain all or substantially all of their native water of hydration. The naturally occurring ore usually has a V.M. of the order of 40 to 50 percent. The fines may be dried to a V.M. at which the free moisture or physically held water is substantially eliminated from the gibbsite and the water of crystallization is left intact. This V.M. will depend on the purity of the ore and is about 25 to 33 percent for high purity ore.

Bauxite which has been activated by calcination at temperatures of the order of 600° F. to 1200° F. to a V.M. of the order of 2 to 6 percent is not amenable to the practice of the present invention.

The term "bauxite" encompasses distinct hydrates of alumina. Some bauxites are characterized by containing as the chief mineral constituent, diaspore, an alumina monohydrate. Others consist principally of alpha alumina trihydrate (so-called "gibbsite"). The bauxite utilized in the practice of the present invention is one whose principal mineral constituent is gibbsite. Normally the bauxite will contain, in addition to the gibbsite, small amounts of siliceous matter and the $SiO_2$ analysis of the ore will usually be of the order of 3 to 15 percent, based on the volatile free weight of the ore. The ore usually contains minor amounts of iron and titanium minerals. The silica usually is present as a clay mineral, especially kaolinite. The silica content of by-product bauxite fines may be appreciably higher than that of the whole ore from which it is derived inasmuch as the clay is a very fine-grained material and it will tend to concentrate in the fines during screening of the fines from the crushed ore.

The colloidal clay we prefer to employ in carrying out the present invention is one whose chief mineral constituent is attapulgite, a hydrated magnesium aluminosilicate. Attapulgite is an acicular clay mineral which is very different from the layer-like clay minerals which are the chief mineral constituents of kaolin and bentonite clays. The latter clays are outside the scope of our invention. It is reasonable to expect that colloidal sepiolite, the other member of the family of acicular clays, will produce the same results that are obtained with the attapulgite.

For reasons of economy, the attapulgite clay we employ is preferably raw clay which has merely been crushed. If desired, grit and coarse agglomerates may be removed from the clay by means which are well-known to those skilled in the art. The naturally occurring clay usually has a free moisture content of about 38 percent and a volatile matter content of about 48 percent. The term "free moisture" (F.M.) as used herein refers to the weight percentage of the clay eliminated by heating the clay substantially to constant weight at 220° F. The clay we employ may be one which has been mildly dried for the purpose of avoiding the expense of shipping the water normally associated with the clay. Thus the clay may be dried to a V.M. of about 13 to 30 percent. Clay which has been dried to a V.M. less than about 13 percent suffers irreversible loss of its colloidal properties as a result of the irreversible agglomeration of the individual colloidally dimensioned attapulgite needles into coarser particles; since such clay is not capable of being dispersed into colloidally dimensioned particles, it is not properly called a "colloidal clay" and is not useful in carrying out our invention.

The alkali metal hydroxide we employ may be NaOH, KOH or LiOH. For reasons of economy NaOH is preferred.

The weight proportion of ingredients we employ is as follows:

Parts by weight
Bauxite fines _____ 100 (V.F. bauxite basis).
Alkali metal hydroxide _____ 0.5–10.
Colloidal attapulgite clay ____ 5–30 (V.F. clay basis).

The preferred proportions are:

Parts by weight
Bauxite fines _____ 100 (V.F. bauxite basis).
Alkali metal hydroxide _____ 1–3.
Colloidal attapulgite clay ____ 10–30 (V.F. clay basis).

In other words, the preferred proportions of ingredients, utilizing bauxite fines having a V.M. of 30 percent and colloidal attapulgite having a V.M. of 20 percent will be as follows:

Parts by weight
Bauxite fines (30% V.M.) _____ 143
Alkali metal hydroxide _____ 1–3
Colloidal attapulgite clay (20% V.M.) _____ 12.5–37.5

In putting our invention into practice, the order of addition of ingredients is immaterial provided that an apparently homogeneous aqueous mixture of uncalcined bauxite fines, colloidal clay and alkali is obtained. Good results are obtained by placing bauxite fines in a pug mill and mixing in the clay and then a solution of alkali metal hydroxide containing a quantity of water calculated to provide an apparently uniform mixture of plastic, moldable consistency. If the granulation is to be accomplished by extrusion, the water should be added in amount to provide a mix of about 30 to 45 percent V.M., and preferably from about 35 to 40 percent V.M. The mixing of bauxite fines, caustic and water can be carried out in other types of apparatus available for this sort of operation, such as for example, a kneader or muller mixer. The mixture is then molded into granules, preferably by extruding the mixture through an orifice and then cutting the extrudate into pellets. The extrusion will be facilitated by operating under vacuum. The extrudate is dried, as at a product temperature of 200° F. to 300° F. to a grindable consistency and the dried material ground and then calcined at a temperature of about 1650° F. to about 2000° F. for a time sufficient to dehydrate fully the mixture so that a product having a V.M. of about 0% is obtained. The preferred calcination temperature is within the limits of 1700° F. to 1850° F. The size to which the dried mixture is ground will vary with the nature of the sugar solution to be treated and with the refining equipment and procedure employed. These granules will be substantially larger than the fine bauxite aggregates composing them and may be, for example, as coarse as 10/30 mesh or as fine as 20/30 mesh or even 20/60 mesh.

The optimum calcination temperature and time will vary with the calcination equipment used. The calcination time will usually be of the order of ½ to 24 hours, and the calcination may be conducted in an atmosphere of air or other oxidizing atmosphere.

After calcination, the granules are cooled and usually they will be washed with water sufficient to eliminate any free alkali therefrom. The washing does not impair the hardness of the granules. This is not true of granules of bauxite fines which have been bonded with sodium silicate in accordance with the teachings of the prior art.

The sugar solutions which are especially amenable to refinement with the novel adsorbent of this invention are sugar refinery wash syrups (affination syrups), and especially affination syrups which have been previously defecated. The sugar solutions may also include those prepared by pressing beets or sugar cane or solutions of the expressed sugar from these sources. Sugar solutions which have been partially decolorized by other adsorbents may in some instances be further refined by percolation through the novel adsorbent of the present invention. Inasmuch as the adsorbent of the present invention has excellent ash removal properties, sugar solutions which have been percolated through it ordinarily will not require costly refinement with an ion-exchange resin.

The sugar solution to be refined is brought into intimate contact with the composite bauxite granules of the present invention by percolating such solution through a bed of granules at a temperature of from 100° F. to 200° F. After percolation, the granules may be washed with water to recover residual sugar and the granules dried and revivified by methods employed in revivifying granular activated bauxite ore adsorbents.

In accordance with one embodiment of our invention, the composite bauxite granules produced by calcining and washing an agglomerated mixture of bauxite fines, alkali metal hydroxide and colloidal clay, are treated with a carbonizable material in a manner such as to result in the dispersion of finely divided carbon particles on the composite bauxite product. This is done to effect a further improvement in the adsorptive capacity of the product. This may be accomplished, for example, by impregnating the cooled composite granules with a solution of carbonizable material, such as a 5 percent sugar solution in amount calculated to deposit 10 percent of carbon on the product, evaporating the composition to dryness and then carbonizing the composition as, for example, by calcining it at about 1500° F. to 1800° F. for about 2 hours in a nitrogen or other reducing atmosphere.

The following examples are given for the sake of more fully explaining our invention.

EXAMPLE I

A hard granular bauxite sugar decolorizing adsorbent of the present invention was produced from bauxite fines. The bauxite fines were obtained by crushing Demerara bauxite ore, a South American bauxite of the gibbsite variety. The bauxite fines were 96 percent by weight finer than 60 mesh and only 16 perecnt by weight were finer than 200 mesh. The analysis of the Demerara fines is as follows:

| | Percent by weight |
|---|---|
| F.M. | 1.4 |
| V.M. | 24.8 |
| $SiO_2$ (V.F. basis) | 13.7 |
| $Fe_2O_3$ (V.F. basis) | 2.2 |
| $TiO_2$ (V.F. basis) | 3.7 |
| $Al_2O_3$ (V.F. basis) | 80.4 |

One hundred parts by weight of the bauxite fines were mixed in a pug mill with 28 parts by weight of "Attagel 30" (the trade name of a colloidal grade of essentially grit-free attapulgite clay supplied by Minerals & Chemicals Corporation of America and having a V.M. of 25 percent and an F.M. of 17 percent). 2.7 parts by weight of NaOH were added to the mixture together with water sufficient to provide a mass of extrudable consistency. The mixture was extruded in an auger extruder machine at 28- to 29-inch vacuum through orifices 3/16-inch diameter, 1-inch land die plate. The extrudate was dried at 300° F. for 16 hours, calcined for an hour in an indirectly fired vertical ceramic tube at 1700° F. in a stream of air (2 liters per minute). The calcined pellets were ground and screened to 10/30 mesh. The samples were washed to remove all water-soluble matter with about 20 times their weight of water, and then dried at 500° F. for 3 hours. The product was designated sample 1.

To illustrate the criticality of calcining the granules of our invention at very high temperature, experimental 10/30 mesh granules were prepared by duplicating the procedure and quantities of ingredients used in producing a product of this invention, but conducting the calcination at two lower temperature levels, namely, at 700° F. and at 1400° F. and then washing with water. The product obtained by calcining the mixture at 700° F. was designated sample 2 and the product which had been calcined at 1400° F. was sample 3.

Also prepared were granules produced by bonding the Demerara bauxite fines with NaOH in the absence of clay. One hundred parts by weight of the fines were mixed with 4.3 parts by weight of NaOH with water sufficient to provide a mixture of extrudable consistency. The mixture was pugged, extruded and dried, and ground, as above. Fractions of the ground extrudate were calcined in air for an hour at three different temperature levels, namely, 700° F., 1400° F., and 1700° F. The calcined products were cooled and washed with water until they were alkali free and then dried at 500° C. for 3 hours. The granules obtained by calcining the mixture at 700° F., 1400° F., and 1700° F. were identified as samples 4, 5, and 6, respectively.

A control adsorbent (sample 7) was prepared in accordance with the prior art by grinding dried Demerara bauxite ore (24.8% V.M.) to 10/30 mesh and calcining the ground bauxite ore at 700° F. for an hour.

All samples were tested for hardness, decolorizing power and effect on pH of the treated sugar solution by the procedures described in U.S. Patent No. 2,352,932, with the results summarized in the accompanying table.

The data reported in the table show that sample 1, the adsorbent produced in accordance with the present invention by mixing bauxite fines with NaOH and Attagel and firing the mixture at 1700° F., was harder than the activated bauxite control, sample 7, and was comparable in its ability to decolorize the raw sugar solution. The data show also that utilizing the combination of attapulgite clay and sodium hydroxide with the bauxite fines, calcination temperatures of 700° F. or 1400° F. were insufficient to produce granules comparable in hardness with the bauxite control.

The results reported in the table further illustrate that samples 4, 5, and 6, all of which were made up with a sodium hydroxide binder in the absence of clay, were inferior in decolorizing capacity to the product of the invention. Also shown by the data is that the product of the invention had little effect on the pH of the sugar solution; the bauxite control and samples 4, 5 and 6 (which were formulated without clay) increased the pH of the sugar solution to higher values than the product of this invention did.

EXAMPLE II

In accordance with our invention, 100 parts by weight of 100/200 mesh Surinam bauxite fines are mixed in a pug mill with 15 parts by weight of Attagel 30, 3 parts by weight of KOH and water to provide a mixture having a V.M. of 38 percent. The mixture is extruded under vacuum through orifices 3/16-inch diameter and the extrudate cut into pellets about 1/4-inch long. The pellets are dried at 500° F. for 24 hours and calcined for 2 hours at 1850° F. in air. The pellets are ground and screened to 20/60 mesh and then washed with water until the washings are alkali free. The washed samples are then dried at 250° F. for 24 hours, thereby yielding our improved granular adsorbent.

*Table*

PROPERTIES OF SUGAR REFINING ADSORBENTS CONTAINING BAUXITE

| Composition Wt. Percent [1] | Sample No. | | | | | | |
|---|---|---|---|---|---|---|---|
| | 1 | 2 | 3 | 4 | 5 | 6 | 7 |
| Granular Bauxite | 0 | 0 | 0 | 0 | 0 | 0 | 100 |
| Bauxite Fines (24.8% V.M.) | 84.8 | 84.8 | 84.8 | 95.8 | 95.8 | 95.8 | 0 |
| NaOH | 1.4 | 1.4 | 1.4 | 4.2 | 4.2 | 4.2 | 0 |
| Attapulgite Clay (25% V.M.) | 13.8 | 13.8 | 13.8 | 0 | 0 | 0 | 0 |
| Calcination Temperature, °F | 1,700 | 700 | 1,400 | 700 | 1,400 | 1,700 | 700 |
| Hardness, percent | 90 | ([5]) | 69 | 77 | 70 | 88 | 84 |
| Treated Sugar Solution:[4] | | | | | | | |
| Estimated Percent Color Removed | 85 | 85 | 85 | 70 | 70 | 70 | 87 |
| Color [2],[3] | 1.5–1.75 | 1.5–1.75 | 1.5–1.75 | 2.5–2.75 | 2.5+ | 2.5+ | 1.25–1.5 |
| pH | 7.40 | | 7.65 | 9.10 | 8.10 | 7.92 | 8.10 |
| Untreated Sugar Solution: | | | | | | | |
| Color [2],[3] | 6.75–7 | | | | | | |
| pH | 7.1 | | | | | | |

[1] Weights of bauxite and clay reported on V.F. basis.
[2] ASTM procedure.
[3] Lower color indicates lighter filtrate.
[4] 47.5° Brix raw sugar solution.
[5] Too soft to measure.

We claim:

1. A method of producing a hard granular sugar decolorizing and ash removal agent from bauxite fines which comprises forming a uniform mixture of fine uncalcined bauxite aggregates with a small amount of an alkali metal hydroxide and a small amount of a clay selected from the group consisting of colloidal attapulgite clay and colloidal sepiolite clay, together with water sufficient to form a mixture of plastic consistency, forming said mixture into granules larger than said bauxite aggregates, and, without removing said alkali metal hydroxide from said granules, calcining them at a temperature in excess of 1600° F. and below the fusion point of the mixture Chem. Abs., vol. 47, page 899c, January–March 1953. for a time sufficient to dehydrate completely said granules.

2. A method of producing a hard granular adsorbent from bauxite fines which comprises forming a uniform mixture consisting essentially of uncalcined bauxite fines, NaOH in amount from 0.5 to 10 percent, based on the volatile free weight of said bauxite, colloidal attapulgite clay in amount from about 5 to 30 percent, based on the volatile free weight of said bauxite, volatile free clay basis, together with water sufficient to form a mixture of plastic consistency, granulating said mixture and, without removing said NaOH from said granules, calcining them at a temperature within the range of 1650° F. to 2000° F. for a time sufficient to dehydrate said mixture, and washing the calcined granules with an aqueous wash liquid so as to remove soluble salts therefrom.

3. The product produced in accordance with the method of claim 1.

4. The product produced in accordance with the method of claim 2.

References Cited in the file of this patent
UNITED STATES PATENTS

| | | | |
|---|---|---|---|
| 2,163,527 | Caldwell | July 22, | 1938 |
| 2,391,116 | Ashley | Dec. 18, | 1945 |
| 2,477,386 | McCarter | July 26, | 1949 |
| 2,563,650 | Heinemann | Aug. 7, | 1951 |
| 2,610,931 | Montgomery et al. | Sept. 16, | 1952 |
| 2,650,202 | Hawes et al. | Aug. 25, | 1953 |
| 2,665,259 | Buffett | Jan. 5, | 1954 |
| 2,763,580 | Zabor | Sept. 18, | 1956 |
| 2,831,818 | Barrett | Apr. 22, | 1958 |

OTHER REFERENCES

Chem. Abs., vol. 47, page 899c, January–March 1953.

UNITED STATES PATENT OFFICE
CERTIFICATE OF CORRECTION

Patent No. 3,098,045                                          July 16, 1963

Aldo P. Allegrini et al.

It is hereby certified that error appears in the above numbered patent requiring correction and that the said Letters Patent should read as corrected below.

Column 8, line 2, strike out "Chem. Abs., vol. 47, page 899c, January-March 1953."--.

Signed and sealed this 14th day of January 1964.

(SEAL)
Attest:
ERNEST W. SWIDER

EDWIN L. REYNOLDS

Attesting Officer

Acting Commissioner of Patents